(12) United States Patent
Rana

(10) Patent No.: US 12,376,600 B2
(45) Date of Patent: Aug. 5, 2025

(54) METHOD AND PLANT FOR PREPARING A FOOD PRODUCT

(71) Applicant: PASTIFICIO RANA S.P.A., San Giovanni Lupatoto (IT)

(72) Inventor: Gian Luca Rana, San Giovanni Lupatoto (IT)

(73) Assignee: PASTIFICIO RANA S.P.A. (IT)

( * ) Notice: Subject to any disclaimer, the term of this patent is extended or adjusted under 35 U.S.C. 154(b) by 166 days.

(21) Appl. No.: 17/438,103

(22) PCT Filed: Mar. 13, 2020

(86) PCT No.: PCT/IB2020/052319
§ 371 (c)(1),
(2) Date: Sep. 10, 2021

(87) PCT Pub. No.: WO2020/188442
PCT Pub. Date: Sep. 24, 2020

(65) Prior Publication Data
US 2022/0183328 A1 Jun. 16, 2022

(30) Foreign Application Priority Data
Mar. 15, 2019 (IT) .......... 102019000003831

(51) Int. Cl.
*A23B 2/08* (2025.01)
*A23B 2/42* (2025.01)
(Continued)

(52) U.S. Cl.
CPC ............ *A23B 2/08* (2025.01); *A23B 2/42* (2025.01); *A23L 5/15* (2016.08); *H05B 3/0009* (2013.01); *A23V 2002/00* (2013.01)

(58) Field of Classification Search
CPC ..... A23L 3/01; A23L 3/16; A23L 3/18; A23L 5/15; H05B 3/00; H05B 3/0004;
(Continued)

(56) References Cited

U.S. PATENT DOCUMENTS 3,146,691 A * 9/1964 Mc K Martin ........... A23L 3/18
159/13.1
5,583,960 A * 12/1996 Reznik ................. H05B 3/0009
392/338
(Continued)

FOREIGN PATENT DOCUMENTS

EP 1290949 A1 3/2003
FR 2926945 A1 * 7/2009 ........... G01F 23/284
(Continued)

OTHER PUBLICATIONS

Stellar Team; "Process Freezing 101: 4 Variables Food Processors Must Understand"; Food for Thought; Feb. 11, 2016; https://stellarfoodforthought.net/process-freezing-101-4-variables-food-processors-must-understand/ (Year: 2016).*
(Continued)

*Primary Examiner* — Drew E Becker
*Assistant Examiner* — Austin Parker Taylor
(74) *Attorney, Agent, or Firm* — The Belles Group, P.C.

(57) ABSTRACT

A method for preparing a substantially pasteurized and/or sterilized food product; the method, which can be used to produce pasta sauces or soups, comprises: a cooking step, during which a base of the food product is obtained by thermally treating a first component at a temperature exceeding 30° C.; a mixing step, during which said base and a second, substantially solid component are mixed together so as to obtain a mixture; and an ohmic treatment step, during
(Continued)

which said mixture is subjected to an ohmic treatment so as to obtain the substantially pasteurized and/or sterilized food product.

11 Claims, 4 Drawing Sheets

(51) Int. Cl.
*A23L 5/10* (2016.01)
*H05B 3/00* (2006.01)

(58) Field of Classification Search
CPC ...... H05B 3/0009; H05B 3/0076; A23B 4/01; A23B 4/06; A23B 4/062; A23B 5/01; A23B 5/04; A23B 7/01; A23B 7/04; A23B 7/0408
USPC .......................................... 426/244
See application file for complete search history.

(56) References Cited

U.S. PATENT DOCUMENTS

| | | | | |
|---|---|---|---|---|
| 5,660,506 | A * | 8/1997 | Berge ................. | F25C 5/20 406/33 |
| 6,524,636 | B1 * | 2/2003 | Clements ............. | A23L 3/365 426/589 |
| 2002/0058094 | A1 | 5/2002 | Akamatsu et al. | |
| 2004/0197451 | A1 * | 10/2004 | Mohammed ......... | H05B 3/0004 426/523 |
| 2007/0243297 | A1 * | 10/2007 | Keller ................. | A23L 3/32 426/521 |
| 2008/0017623 | A1 * | 1/2008 | Dock .................. | A23L 5/15 219/201 |
| 2008/0020110 | A1 * | 1/2008 | Dock .................. | A23L 3/005 99/483 |
| 2010/0126988 | A1 * | 5/2010 | Mackay .............. | A23L 3/0155 219/700 |
| 2011/0088569 | A1 * | 4/2011 | Demicheli .......... | A23B 7/01 99/483 |
| 2012/0228283 | A1 * | 9/2012 | Ochoa Gonzalez . | H05B 3/0004 219/482 |
| 2013/0052314 | A1 * | 2/2013 | Nafisi-Movaghar ..... | A23B 7/10 426/639 |
| 2014/0322403 | A1 * | 10/2014 | Drozd ................. | A23L 3/005 99/332 |
| 2015/0050400 | A1 * | 2/2015 | Timmermans ...... | A23C 3/02 426/244 |

FOREIGN PATENT DOCUMENTS

| | | | |
|---|---|---|---|
| JP | 2003289838 | A * | 10/2003 |
| JP | 2007129995 | A * | 5/2007 |
| WO | WO 2017/002072 | A1 | 1/2017 |

OTHER PUBLICATIONS

Medeiros et al.; "Freezer Storage"; Ohioline; May 28, 2015; https://ohioline.osu.edu/factsheet/HYG-5402 (Year: 2015).*

Silva et al.; "Ohmic Heating: An Emerging Concept in Organic Synthesis"; Chem. Eur. J. 2017, 23, 7853. https://chemistry-europe.onlinelibrary.wiley.com/doi/full/10.1002/chem.201700307 (Year: 2017).*

M.C. Knirsch et al., "Ohmic heating—a review", Trends in Food Science & Technology., Elsevier Science Publishers, GB, vol. 21, No. 9, Sep. 1, 2019 (Sep. 1, 2019), pp. 436-441, Retrieved on Jun. 23, 2010.

K. Shiby Varghese et al., Technology, Applications and Modelling of Ohmic Heating: A Review., Journal of Food Science and Technology, Springer (India) Private Ltd., vol. 51, No. 10, Apr. 29, 2012 (Apr. 29, 2012), pp. 2304-2317; Retrieved on Apr. 29, 2012.

Antonio Vicente: "Ohmic heating in the food industry", Website: https://www.newfoodmagazine.com/article/610/ohmic-heating-in-the-food-industry/ Ohmic Heating in the Food Industry., Retrieved Dec. 4, 2017, p. 7.

* cited by examiner

METHOD AND PLANT FOR PREPARING A FOOD PRODUCT

PRIORITY CLAIM

This application is a U.S. national stage application under 35 U.S.C. § 371 of PCT Application No. PCT/IB2020/052319, filed Mar. 13, 2020, which claims priority from Italian Patent Application No. 102019000003831 filed Mar. 15, 2019, the entire disclosure of the aforementioned priority applications are incorporated herein by reference in their entireties.

TECHNICAL FIELD

The invention relates to a method and to a plant for preparing a substantially pasteurized and/or sterilized food product. Furthermore, the invention relates to a food product.

The invention can advantageously be applied in the field of the preparation of ready-to-use pasta sauces and soups, to which explicit reference will be made in the description below without because of this loosing in generality.

CONTEXT OF THE INVENTION

In the food industry, products that do not need to be cooked, but, at most, need to be heated up by end users (for instance, ready-to-use sauces and/or soups) are arousing more and more interest among consumers.

However, currently available food products of the type described above do not always meet the consumers' taste and desire for food that looks like it is as natural as possible (also in terms of taste and texture) and possibly actually is as natural as possible.

Furthermore, this type of food products needs, in order to obtain an effective pasteurization, to be treated for relatively long amounts of time at temperatures typically exceeding 90° C.

The object of the invention is to provide a method and a plant for preparing food products as well as a food product, which at least partially overcome the drawbacks of the prior art and, at the same time, are easy and inexpensive to be implemented.

SUMMARY

According to the present invention, there are provided a method and a plant for preparing food products as well as a food product according to the appended independent claims and, preferably, according to any one of the claims that directly or indirectly depend on said independent claims.

BRIEF DESCRIPTION OF THE FIGURES

The invention will now be described with reference to the accompanying drawings, which show non-limiting embodiments thereof, wherein.

DETAILED DESCRIPTION

Figure 1:
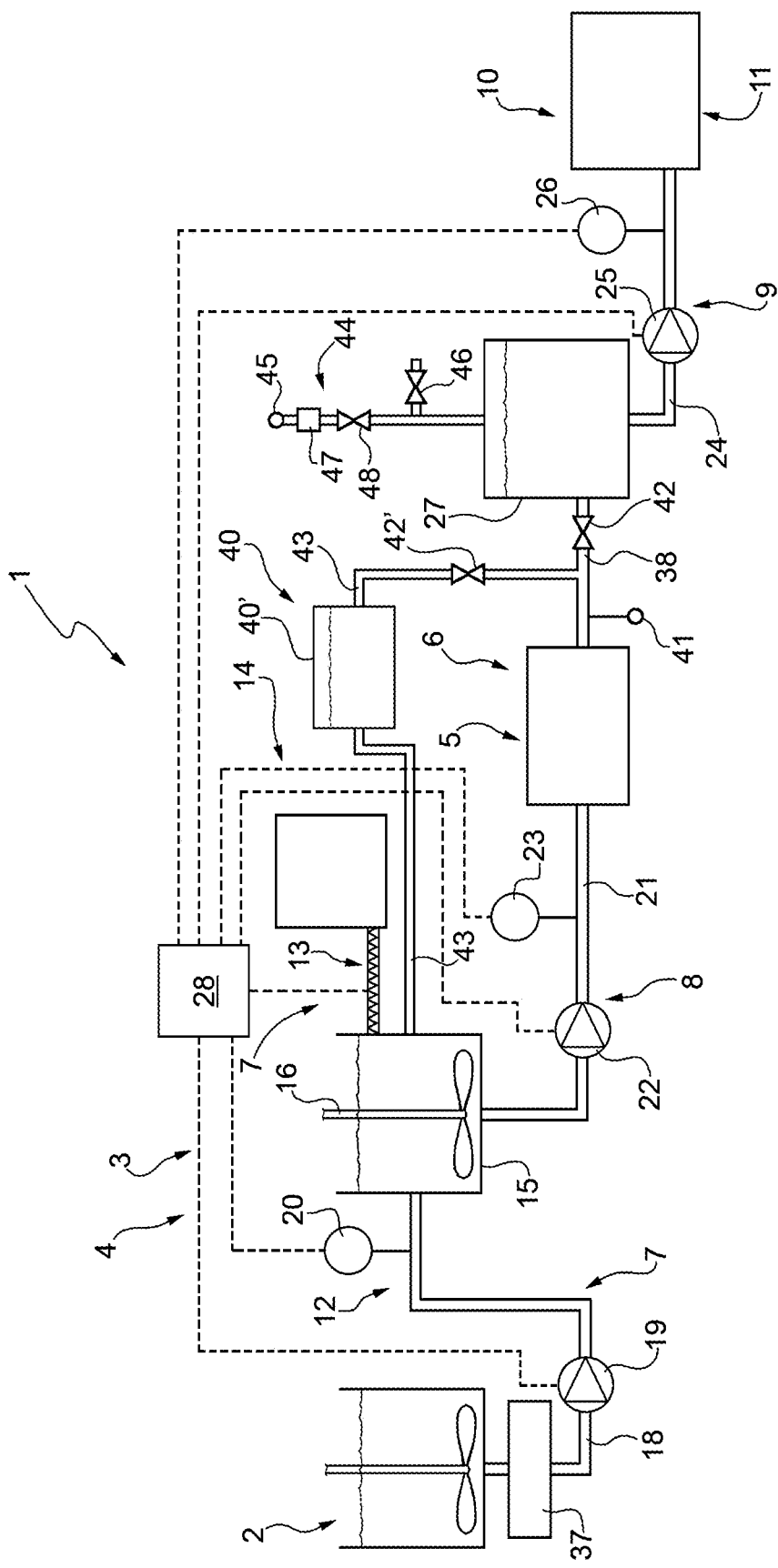
FIG. 1 schematically shows a plant according to the invention.

In FIG. 1, number 1 indicates, as a whole, a plant for preparing a substantially pasteurized and/or substantially sterilized (in particular, substantially pasteurized) food product.

The plant comprises a cooking assembly 2, which is configured to (designed to) prepare a base of the food product by thermally treating a first component at a temperature of at least about 30° C. (in particular, at least about 50° C.; more in particular, at least about 80° C.; even more in particular, at least about 90° C.)

The cooking assembly 2, typically, is configured to (designed to) thermally treat the first component up to a temperature of about 100° C. (in particular, up to about 95° C.; more in particular, up to about 90° C.)

The cooking assembly 2 is normally configured to (designed to) thermally treat (at the temperatures indicated above) the first component for an amount of time of about 5 minutes (in particular, at least 10 minutes). More precisely, the cooking assembly 2 is configured to (designed to) thermally treat (at the temperatures indicated above) the first component for an amount of time of about 80 minutes.

In particular, the first component is at least partially liquid (at room temperature—about 20° C.—and at atmospheric pressure). More in particular, the first component contains at least 60% (more precisely, at least 80%; even more precisely, at least 90%) by weight, relative to the total weight of the first component, of water.

The plant 1 further comprises a mixing assembly 3, which is arranged in the area of a mixing station 4 and is configured to (designed to) combine (mix) said base and a second component so as to obtain a mixture; and an ohmic treatment assembly 5, which is arranged in the area of a treatment station 6 and is configured to (designed to) subject said mixture to an ohmic treatment so as to obtain the substantially pasteurized (and/or sterilized) food product.

By so doing, experiments have surprisingly shown that the second component is pasteurized (and/or sterilized), but, at the same time, the texture, the taste and/or the nutritional content thereof are preserved. This is presumably due to the fact that the second component is not treated at high temperatures for prolonged amounts of time, which, on the other hand, is what happened in the prior art.

According to some non-limiting embodiments, the first component comprises (in particular, mainly consists of; more in particular, is) an ingredient chosen in the group consisting of: vegetables (for example puréed vegetables and/or vegetable extract), oil, dairy products, and a combination thereof.

For example, the vegetables comprise (in particular, mainly consist of; more in particular, are) tomatoes, aubergines, peppers, artichokes, zucchini, asparaguses, and a combination thereof.

For example, the dairy products comprise (in particular, mainly consist of; more in particular, are) butter, milk, cream, Parmesan cheese, Pecorino cheese, Gorgonzola cheese, and a combination thereof.

More precisely, though not necessarily, the first component comprises (in particular, mainly consists of; more in particular, is) an ingredient chosen in the group consisting of: tomato, oil, butter, milk, cream, and a combination thereof.

In some specific cases, the first component comprises (in particular, mainly consists of; more in particular, is) tomato.

It should be pointed out that the first component can comprise different combinations of herbs, salt, pepper and/or hot pepper.

In this text, if something "mainly consists of" a component (ingredient) or a group of components (ingredients), this means that the component (ingredient) or the group of components is at least 70% (in particular, at least 80%) by weight of that something.

According to some non-limiting embodiments, the second component comprises (in particular, mainly consists of; more in particular, is) a substantially solid ingredient. In particular, said ingredient of the second component, before being brought to the ohmic treatment assembly 5, is substantially raw. Alternatively, said ingredient is cooked. In some cases, said ingredient is deep-frozen (or fresh). In particular, said ingredient of the second component is chosen in the group consisting of: vegetables, meat, fish, shellfish, and a combination thereof.

More precisely, said ingredient of the second component is chosen in the group consisting of: vegetable pieces, meat pieces; fish pieces, shellfish pieces, and a combination thereof.

Advantageously, though not necessarily, the plant 1 further comprises a feeding assembly 7 to bring the base and the second component to the mixing station 4 (in particular, to the mixing assembly 3); a conveying assembly 8 to bring the mixture from the mixing station 4 to the (more precisely, through the) treatment station 6 (more precisely, ohmic treatment assembly 5); and a conveying assembly 9 to convey the substantially pasteurized (and/or sterilized) food product from the treatment station 6 (from the ohmic treatment assembly 5) to an output station 10.

According to some non-limiting embodiments, the plant 1 comprises a packing assembly 11, which is arranged in the area of the output station 10 and is configured to (designed to) insert the above-mentioned pasteurized (and/or sterilized) food product in suitable containers (for instance, jars).

According to some non-limiting embodiments, the feeding assembly 7 comprises a feeding device 12 to convey the base from the cooking assembly 2 to the mixing station 4 (in particular, to the mixing assembly 3) and a feeding assembly 13 to convey the second component from a storing device 14 to the mixing station 4 (in particular, to the mixing assembly 3).

Advantageously, though not necessarily, the storing device 14 is configured to (designed to) keep the second component at a temperature below −10° C. (in particular, below −15° C.; more in particular, below −17° C.)

By so doing, experiments have surprisingly shown that the second component is pasteurized (and/or sterilized), but, at the same time, the texture, the taste and/or the nutritional content are preserved even further. This is presumably due to the fact that the second component, even when it is pasteurized (and/or sterilized) by the ohmic treatment assembly 5, does not reach high temperatures over long times, but rather within relatively short amounts of time, and the heating does not takes place through conduction and/or convection, which is what happens in traditional methods, but directly through the electric current flowing through the product (first and second component). Also, the uniformity of the pasteurization (and/or sterilization) of the component is much better compared to traditional heating methods.

Advantageously, though not necessarily, the feeding device 13 is configured to (designed to) feed the second component (in particular, the ingredient thereof) to the mixing station at a temperature below about 0° C. (in particular, below about −10° C.; more in particular, below about −15° C.)

According to some non-limiting embodiments, the feeding device 13, the mixing assembly 3 and the conveying assembly 8 are configured to (designed to) feed the second component (in particular, the ingredient thereof) to the treatment station 6 at a temperature below about 10° C. (in particular, below about 5° C.)

Advantageously, though not necessarily, the ohmic treatment assembly 5 (which is arranged in the area of the treatment station 6) is configured to (designed to) subject said mixture to a potential difference with a frequency of at least about 18 KHz (in particular, of at least about 22 KHz), for example up to about 26 KHz (in particular, up to about 23 KHz).

More precisely, the ohmic treatment assembly 5 is configured to (designed to) subject the mixture to a potential difference of at least about 500 Volt (in particular, up to about 700 Volt; more in particular up to about 5700 Volt—for example, up to about 5100 Volt).

According to the embodiment shown in FIG. 1, the mixing assembly 3 comprises one (single) mixing chamber 15, which is configured to (designed to) contain said base and said second component.

Advantageously, though not necessarily, the mixing assembly 3 also comprises a mixing device 16 (schematically shown in FIG. 1), which is arranged inside the mixing chamber 15. The mixing device 16 is shaped so as to obtain a homogeneous distribution of the second component in the base. In particular, the mixing device 16 comprises two mixers, which are shaped so as to push the content arranged in a central area of the mixing chamber 15 downward and the content arranged in a peripheral area (close to the side wall) of the mixing chamber 15 upward.

Figure 2:
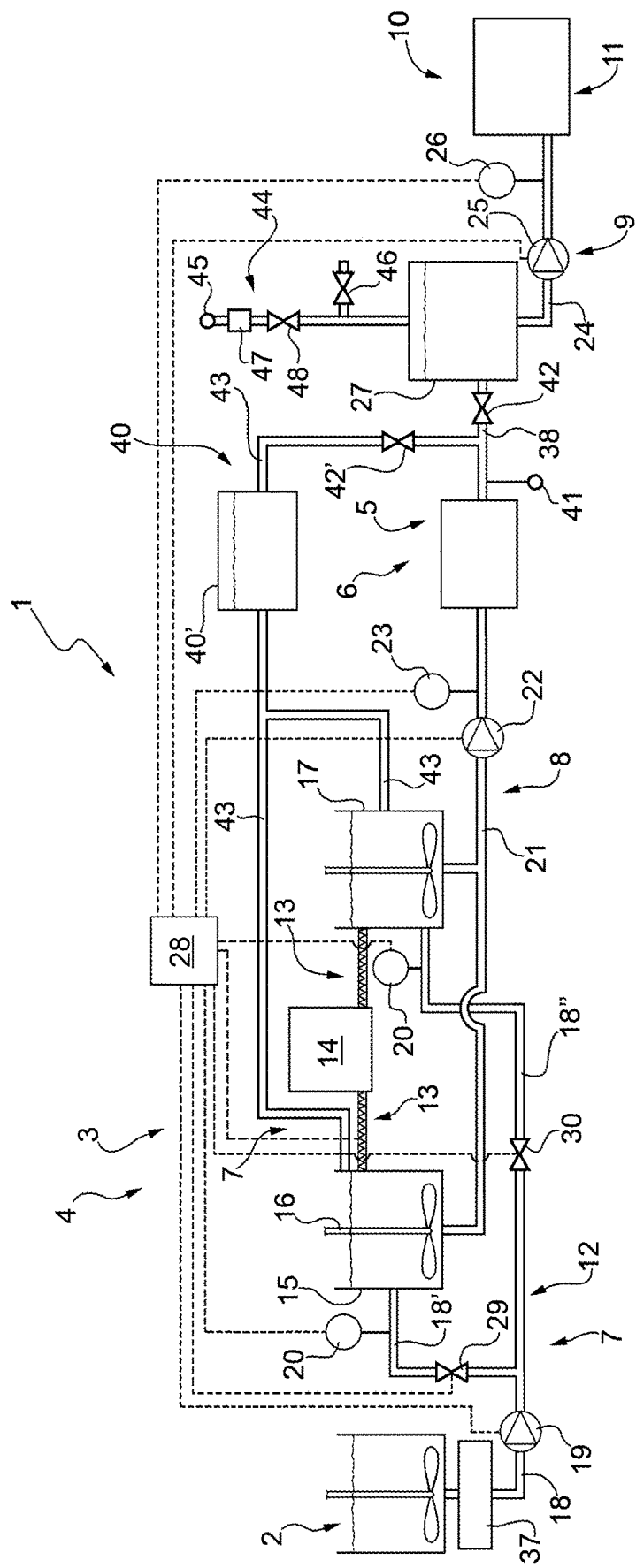
FIG. 2 schematically shows a further embodiment of a plant according to the invention.

According to the embodiment shown in FIG. 2, the mixing assembly 3 comprises a further mixing chamber 17 (in addition to the mixing chamber 15), which is substantially similar to the mixing chamber 15.

By alternating the feeding of the mixture from the mixing chamber 15 and from the mixing chamber 17, the ohmic treatment assembly 5 can be supplied in a substantially continuous manner (and, hence, it is possible to obtain a substantially continuous production of the final, pasteurized and/or sterilized food product).

According to some non-limiting embodiments which are not depicted herein, each mixing chamber 15 and 17 comprises a respective (water) heating jacket to supply heat to the content of the mixing chambers 15 and 17.

According to some non-limiting embodiments, the feeding device 12 comprises a duct 18, which extends between (from) the cooking assembly 2 and (to) the mixing assembly 3, a conveying device 19 (for example, a pump) to push the aforesaid base along the duct 18, and a flow detector 20 to detect the flow along the duct 18.

In particular, the feeding device 13 comprises a conveyor for solid ingredients (for example, a conveyor belt or an Archimedes' screw). In some specific cases, the feeding device 13 comprises (is) a conveyor belt.

According to some non-limiting embodiments, the conveying device 8 comprises a duct 21, which extends between (from) the mixing assembly 3 and (to) the ohmic treatment assembly 5, a conveying device 22 (for example, a pump) to push the aforesaid mixture along the duct 21, and a flow detector 23 to detect the flow along the duct 21.

Advantageously, though not necessarily, the conveying assembly 9 comprises a duct 24, which extends between the ohmic treatment assembly 5 and the output assembly 10 (in particular, the packing assembly 11), a conveying device 25 (for example, a pump or another suitable device) to push the aforesaid food product along the duct 24, and a flow detector 26 to detect the flow along the duct 24.

According to some non-limiting embodiment, a tank 27 is provided in order to balance possible differences between the quantity of food product coming out of the ohmic treatment assembly and the quantity of product requested by the packing assembly 11. In particular, the tank 27 is arranged (along the duct 24) between the ohmic treatment assembly 5 and the output station 10.

According to some advantageous, non-limiting embodiments, the plant 1 also comprises a tank (resting tank) 37, which is configured to (designed to) collect the aforesaid base (coming from the cooking assembly 2). In this way, the mixing assembly 3 can be supplied in a substantially continuous manner (basically making up for the discontinuity in the output of the base from the cooking assembly 2).

In particular, the tank 37 is arranged along the duct upstream of the conveying device 19 (in particular, between the cooking assembly 2 and the conveying device 19).

According to some embodiments which are not shown herein, there is also provided an additional conveying device (i.e. a known pump that is not shown herein), which is arranged along the duct 18 upstream of the tank 37 (in particular, between the cooking assembly 2 and the tank 37).

Advantageously, though not necessarily, the plant 1 also comprises a control unit 28, which is configured to (designed to) regulate the operation of the conveying devices 19, 22 and/or 25 (pumps) and/or of the feeding device 13 (and/or of the additional conveying device, which is not shown) depending on the information detected by the flow detectors 20, 23, ad/or 26 (and on desired target flow rates).

Advantageously, though not necessarily, the conveying devices 19, 22 and/or 25 comprise (more precisely, are) volumetric pumps. In these cases, in particular, the control unit 28 is configured to (designed to) regulate the operation (only) based on desired target flow rates.

Figure 5:
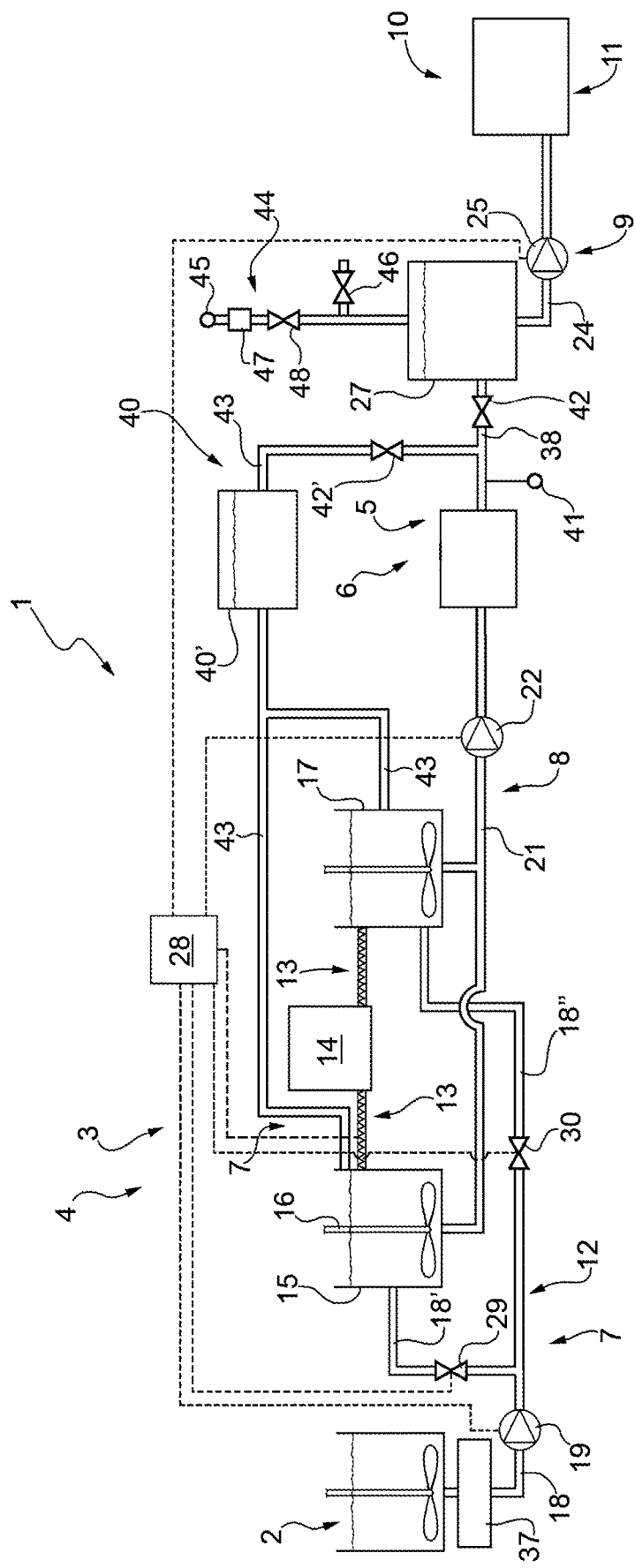
FIG. 5 schematically shows a further embodiment of a plant according to the invention.

In these cases, according to further embodiments (like the one shown in FIG. 5), the plant is not provided with the flow detectors 20, 23 and/or 26.

In particular, the control unit 28 is configured to (designed to) regulate the conveying device 19 and the feeding device 13 (based on the information detected by the flow detector 20) so that the weight ratio between the aforesaid base and the aforesaid second component, inside the mixing assembly 3, lies within a given range.

Alternatively or in addition, the control unit 28 is configured to (designed to) regulate the conveying device 22 (based on the information detected by the flow detector 23) so that the speed of the mixture through the ohmic treatment assembly 5 lies within a given range.

Alternatively or in addition, the control unit 28 is configured to (designed to) regulate the conveying device 25 (based on the information detected by the flow detector 26) so that the the quantity of food product (within a given amount of time) supplied to the packing assembly 11 lies within a given range.

Advantageously, though not necessarily (according to the embodiment shown in FIG. 2), the duct 18 has two branches 18' and 18". The branch 18' extends up to the mixing chamber 15. The branch 18" extends up to the mixing chamber 17.

In these cases, a valve 29 is preferably arranged along the branch 18' and a valve 30 is preferably arranged along the branch 18" so as to stop the flow of the aforesaid base along the respective branches 18' and 18". In particular, the control unit 28 is configured to (designed to) open and close the valves 29 and 30 so that the base is alternatively fed to the mixing chamber 15 or to the mixing chamber 17.

Figure 3:
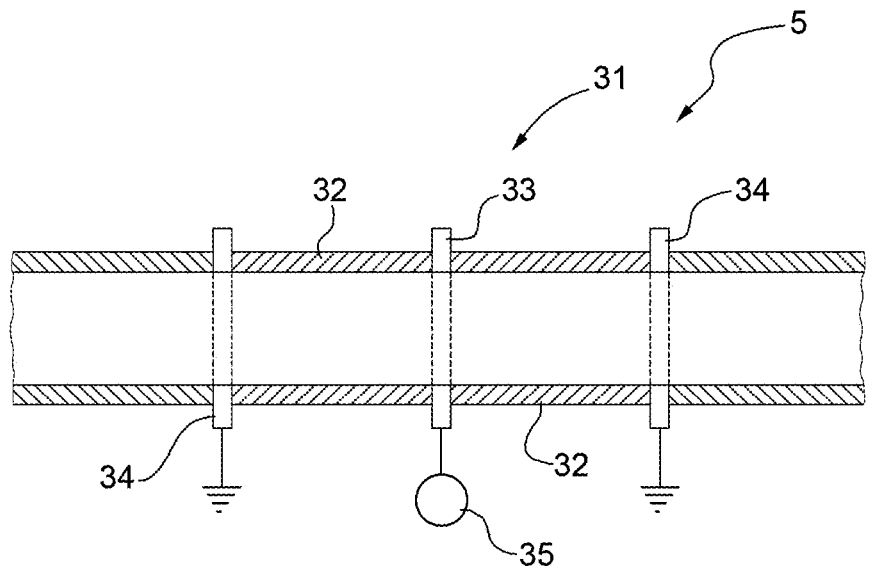
FIG. 3 is a side sectional view of a detail of the plants of FIGS. 1 and 2.

With particular reference to FIG. 3, according to some non-limiting embodiments, the ohmic treatment assembly 5 comprises a (substantially straight) duct 31, which is provided with two segments 32 made of a dielectric material (for example, Pyrex); a central flange 33 made of metal (or of another electrically conductive material), which is arranged between the two segments 32; and two side flanges 34 made of metal (or of another electrically conductive material), which are arranged at the ends of the segments 32 opposite the central flange 33 and are grounded. The ohmic treatment assembly 5 further comprises a voltage generator 35, which is connected to the central flange 33 so as to the impose the aforesaid potential difference.

According to specific embodiments, the ohmic treatment assembly 5 is structured in the way disclosed in patent EP20308316B1.

Figure 4:
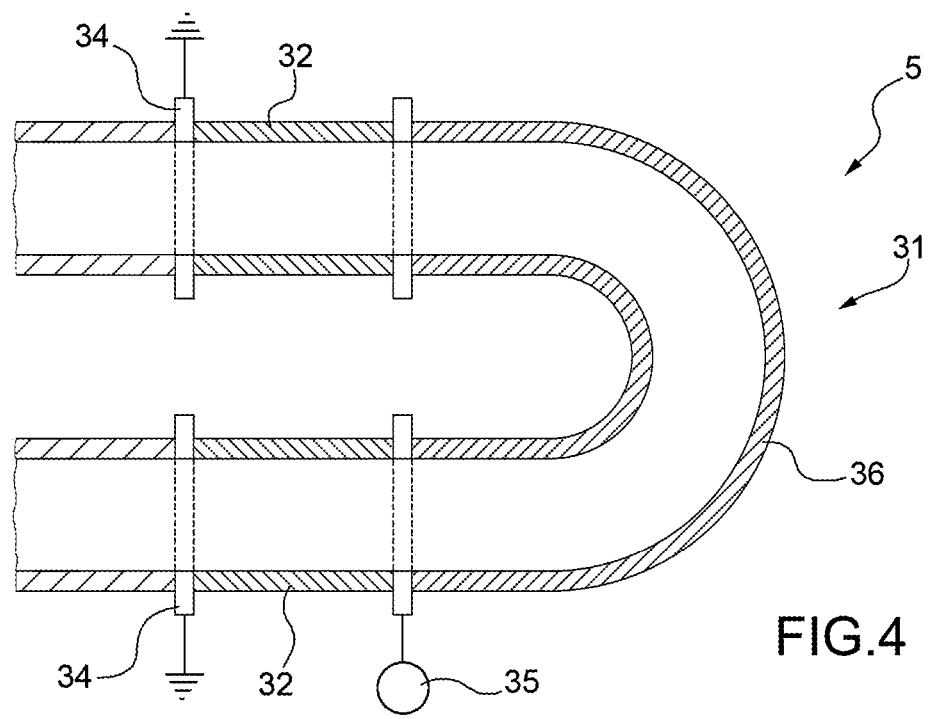
FIG. 4 is a side sectional view of an alternative embodiment of the detail of FIG. 3.

With particular reference to FIG. 4, according to some non-limiting embodiments, the ohmic treatment assembly 5 is similar to the one shown in FIG. 3 and the difference lies in the fact that it has (instead of the central flange 33) a curved segment 36 made of metal (or of another electrically conductive material).

Advantageously, though not necessarily (FIGS. 1, 2 and 5), the duct 24 has a segment 38, which extends from the ohmic treatment assembly 5 to the tank 27, covering some metres. In this way, the effects of the ohmic treatment (and, hence, the pasteurization and/or the sterilization) can be completed while the aforesaid mixture is delivered from the ohmic treatment assembly 5 to the tank 27.

According to some non-limiting embodiments, the segment is a tube bundle (which means that it has different portions, which are parallel to one another and are joined by curved segments). In this way, the segment 38 has limited dimensions.

Advantageously, though not necessarily, the segment 38 has a variable length. In this way, it is possible to change the amount of time during which the mixture is kept at a relatively high temperature (in particular, exceeding 80° C.; more in particular, exceeding 100° C.; even more in particular, up to 140° C.) following the ohmic treatment.

According to some embodiments, the tube bundle 38 is provided with a plurality of bypasses, which, when they are activated, allow part of the parallel portions not to be used, thus shortening the path between the ohmic treatment assembly 5 and the tank 27 (hence, also reducing, as a consequence, the amount of time during which the mixture is kept at a relatively high temperature).

Advantageously, though not necessarily, the plant 1 comprises a recirculation assembly 40, which is designed to lead the aforesaid mixture from a position downstream of the ohmic treatment assembly 5 (in particular, upstream of the tank 27; more in particular, of the segment 38) back to the mixture assembly 3 (more in particular, to the mixing chamber and/or to the mixing chamber 17). In these cases, according to some non-limiting embodiments, the plant 1 (more precisely, the recirculation assembly 40) also comprises a sensor 41, which is designed to detect the temperature of the mixture coming out of (downstream of) the ohmic treatment assembly 5. More precisely, the sensor 41 is arranged upstream of the tank 27 (in particular, along the segment 38).

In particular, in use, the recirculation assembly 40 is operated when the sensor 41 detects that the temperature of the mixture is below a limit temperature (for example, 90° C.) which allows for the actual pasteurization (and/or sterilization) of the mixture itself (so as to obtain, at least at the end of the segment 38, the substantially pasteurized and/or sterilized food product).

According to some non-limiting embodiments, the recirculation assembly 40 comprises a recirculation duct 43, which extends from the segment 38 to the mixing assembly 3 (in particular, to the mixing chamber 15 and, through a branch of its, to the mixing chamber 17, when its is present).

More precisely, the recirculation assembly 40 comprises a valve 42 arranged downstream of the ohmic treatment assembly 5 (in particular, along the segment 38—so as to regulate the flow towards the packing assembly 10). Even more precisely, the valve 42 is arranged along the segment 38 downstream of the joint to the recirculation assembly 43 (between the joint to the recirculation duct 43 and the tank 27).

Advantageously, though not necessarily, the recirculation assembly 40 comprises a further valve 42', which is arranged along the duct 43 (so as to regulate the flow along the duct 43).

The valve 42, the valve 42' and the sensor 41 are connected to the control unit 28, which is designed to operate the valves 42 and 42' depending on the temperature detected by the sensor 41. In particular, in use, when the temperature is below the aforesaid limit threshold, the control unit 28 operates the valves 42 and 42' so as to direct the mixture coming from the ohmic treatment assembly 5 to the mixing assembly 3; when the temperature exceeds the limit temperature, the control unit 28 operates the valves 42 and 42' so as to direct the mixture coming from the ohmic treatment assembly 5 towards the packing assembly (in particular, towards the tank 27).

According to alternative embodiments, the valves 42 and 42' are replaced by one single three-way valve, which is arranged in the area of the joint between the segment 38 and the duct 43. In these cases, the aforesaid three-way valve and the sensor 41 are connected to the control unit 28, which is designed to operate the three-way valve depending on the temperature detected by the sensor 41.

Advantageously, though not necessarily, the recirculation assembly 40 also comprises a tank 40', which is designed to balance possible lacks of homogeneity between what comes from the segment 38 to what is fed to the mixing assembly 3.

Advantageously, though not necessarily, the plant 1 also comprises a pressure assembly 44 to keep the pressure inside the segment 38 (in particular, also inside the tank 27) within a given range above atmospheric pressure (in particular, between about 1.2 and about 5 bar; more in particular, between about 1.4 and about 1.8 bar). In this way, even though the aforesaid mixture and/or the aforesaid substantially pasteurized (and/or sterilized) food product can (at least locally, in some points) reach a temperature close to or exceeding 100° C., the possibility of boiling/evaporation of the liquid component of the mixture and/or of the food product significantly decreases.

According to some non-limiting embodiments, the pressure assembly 44 comprises a pressure reducer 45 connected to the tank 27. In particular, the tank 27 is a closed tank and a release valve 46, a filter 47, a controlled valve 48 and the pressure reducer are mounted on it.

Advantageously, though not necessarily, if the recirculation assembly 40 is present, the recirculation assembly 40 comprises a further pressure assembly to keep the pressure inside the duct 43 (and in the tank 40') within a given range above atmospheric pressure (in particular, between about 1.2 and about 5 bar; more in particular, between about 1.4 and about 1.8 bar). In these cases, the further pressure assembly is connected to the tank 40' and is structured in a way that is substantially identical to the pressure assembly 44.

In accordance with a further aspect of the invention, there is provided a method for preparing (namely, a preparation method for) a food product (namely, a method which prepares the food product), which is substantially pasteurized and/or substantially sterilized (in particular, substantially pasteurized).

Advantageously, though not necessarily, the method is implemented by the plant 1 described above.

The method comprises a treatment step, during which the second component (as described above—in particular, comprising a substantially solid ingredient) is subjected to an ohmic treatment so as to obtain the substantially pasteurized (and/or sterilized) food product.

According to some non limiting embodiments, the method comprises a cooking step, during which a base (as defined above) is obtained by thermally treating the first component (as defined above) at a temperature exceeding 30° C. (in particular, exceeding 50° C.); and a mixing step, during which said base and a second component are mixed together so as to obtain a mixture.

In particular, during the treatment step, the mixture is subjected to an ohmic treatment so as to obtain the substantially pasteurized (and/or sterilized) food product.

In particular, during the cooking step, the first component is substantially (mainly - at least partially) liquid.

Advantageously, though not necessarily, at the beginning of the ohmic treatment step, the second component (in particular, the ingredient of the second component) has a temperature below 10° C. (in particular, below 5° C.). In particular, at the beginning of the ohmic treatment step, the second component (in particular, the ingredient of the component) is substantially (mainly - at least partially) solid.

In particular, at the beginning of the ohmic treatment step, the base is substantially (mainly - at least partially) liquid.

According to some non-limiting embodiments, the method comprises a feeding step, during which the base and the second component are brought by the feeding assembly 7 to the mixing station 4, where the mixing step takes place; a first conveying step, during which the conveying assembly 8 conveys the mixture from the mixing station 4 to (in particular, through) the treatment station 6, where the treatment step takes place; and a second conveying step, during which the conveying assembly 9 brings the substantially pasteurized (and/or sterilized) food product to the output station 10.

In particular, during the feeding step (and during the mixing step), the base is partially (substantially—mainly) liquid.

Advantageously, though not necessarily, during the feeding step, the base and the second component are brought close to one another so as to come into contact.

Advantageously, though not necessarily, during the (at least part of the) feeding step, at least part of the (the) second component is at a temperature below about 0° C. (in particular, below about −10° C.; more in particular, below about −15° C.); in particular, during the (at least part of the) feeding step, the aforesaid ingredient (of the second component) is at a temperature below about 0° C. (in particular, below about −10° C.; more in particular, below about −15° C.)

More precisely, at the beginning of the mixing step, at least part of the second component is at a temperature below about 0° C. (in particular, below about −10° C.; more in particular, below about −15° C.); in particular, at the beginning of the mixing step, the aforesaid ingredient (of the second component) is at a temperature below about 0° C. (in particular, below about −10° C.; more in particular, below about −15° C.)

According to some embodiments, during the (at least part of the) first conveying step (in particular, when the second component - more precisely, the first ingredient—enters the treatment station 6), at least part of said second component is at a temperature below about 10° C. (in particular, below about 5° C.); in particular, during the (at least part of the) first conveying step (in particular, when the component—more precisely, the first ingredient - enters the treatment station 6), the aforesaid ingredient (of the second component) is at a temperature below about 10° C. (in particular, below about 5° C.)

Advantageously, though not necessarily, during the treatment step, the ohmic treatment assembly 5 (which is arranged in the area of the treatment station 6) subjects the mixture to a potential difference with a frequency of at least about 18 KHz (in particular, of at least about 22 KHz), for example up to about 26 KHz (in particular, up to about 23 KHz).

More precisely, though not necessarily, during the treatment step, the ohmic treatment assembly 5 subjects said mixture to a potential difference of at least about 500 Volt (in particular, up to about 700 Volt; more in particular up to about 5700 Volt—for example, up to about 5100 Volt).

Advantageously, though not necessarily, during the treatment step, the mixture reaches a temperature of at least about 90° C. (in particular, at least about 100° C.; more in particular, at least about 110° C.). According to some non-limiting embodiments, during the treatment step, the mixture reaches a temperature up to about 140° C.

Advantageously, though not necessarily, said ohmic treatment assembly 5 comprises a treatment area (corresponding to the segments 32), where the aforesaid potential difference is applied. During the treatment step, a (in particular, each) defined portion of said mixture goes through the treatment area in an amount of time smaller than 30 seconds (in particular, at least 5 seconds). Advantageously, though not necessarily, the aforesaid method is implemented by the plant 1 described above.

In accordance with a further aspect of the invention, there is provided a substantially pasteurized (and/or sterilized) food product obtained by means of the method described above. Said food product comprises the aforesaid second component, which is substantially pasteurized, but, at the same time, has organoleptic, texture and nutritional content features that ore similar to the ones of a fresh product.

Unless explicitly indicated otherwise, the content of the references (articles, books, patent applications, etc.) mentioned above is entirely quoted herein. In particular, the above-mentioned references are included herein by reference.

The invention claimed is:

1. A method of preparing a substantially pasteurized and/or sterilized food product; the method comprises:
   a cooking step, during which a base of the food product is obtained by thermally treating a first component at a temperature of at least about 30° C.;
   a mixing step, during which said base and a second component are mixed together so as to obtain a mixture;
   a treatment step, during which said mixture is subjected to an ohmic treatment so as to obtain the substantially pasteurized and/or sterilized food product; said second component comprises a first, substantially solid ingredient;
   a first conveying step, during which said mixture is fed to a treatment station, where said mixture is subjected to an ohmic treatment; during the first conveying step, said first ingredient is conveyed to the treatment station at a temperature below about 10° C.; and
   during the treatment step, an ohmic treatment assembly subjects said mixture to a potential difference of at least about 500 Volt with a frequency from about 18 KHz to about 26 KHz in an amount of time below 30 seconds so that said first ingredient, which, at the beginning of the treatment step, has a temperature below about 10° C., is pasteurized and/or sterilized.

2. A method according to claim 1 and comprising a feeding step, during which said base and said second component are brought by a feeding assembly to a mixing station, where the mixing step takes place; a first conveying step, during which a first conveying assembly conveys said mixture from the mixing station to the treatment station, where the treatment step takes place; and a second conveying step, during which a second conveying assembly brings said substantially pasteurized and/or sterilized food product to an output station.

3. A method according to claim 1, wherein said base is at least partially liquid.

4. A method according to claim 1, wherein said second component comprises a first ingredient selected in the group consisting of: vegetable, meat, fish, shellfish, and a combination thereof.

5. A method according to claim 1 and comprising a feeding step, during which said base and said second component are brought close to one another so as to come into contact; during the feeding step, said first ingredient is at a temperature below about 0° C.

6. A method according to claim 1, wherein, during the treatment step, the ohmic treatment assembly subjects said mixture to a potential difference with a frequency of at least about 22 KHz.

7. A method according to any one of the preceding claim 1, wherein, during the treatment step, an ohmic treatment assembly causes said mixture to be subjected to a potential difference of up to about 5700 Volt.

8. A method according to claim 6, wherein said ohmic treatment assembly comprises a treatment area, where said potential difference is applied; during the treatment step, a defined portion of said mixtures goes through said treatment area in an amount of time of at least 5 seconds.

9. A method according to claim 1 and implemented by a plant for preparing a substantially pasteurized and/or sterilized food product; the plant comprises
   a cooking assembly, which is configured to prepare a base of the food product by thermally treating a first component at a temperature above about 30° C.;
   a feeding assembly for bringing said base and a second component to a mixing station;
   a mixing assembly, which is arranged in the area of the mixing station and is configured to combine said base and a second component so as to obtain a mixture;
   a first conveying assembly to bring said mixture from the mixing station to a treatment station;
   an ohmic treatment assembly, which is arranged in the area of the treatment station and is configured to subject said mixture to an ohmic treatment so as to obtain the substantially pasteurized and/or sterilized food product; and a second conveying assembly for conveying the substantially pasteurized and/or sterilized food product from the treatment station, to an output station; the second component comprising at least one first, substantially solid ingredient;

wherein the feeding assembly comprises a first feeding device for conveying said base from the cooking assembly to the mixing station and a second feeding device for conveying the second component from a storing device to the mixing station;

wherein the storing device is configured to keep the second component at a temperature below about −10° C.

10. A method according to claim 1, wherein said ohmic treatment assembly is configured to subject said mixture to a potential difference up to about 5700 Volt.

11. A method of preparing a substantially pasteurized and/or sterilized food product; the method comprises:

a cooking step, during which a base of the food product is obtained by thermally treating a first component at a temperature of at least about 30° C.;

a mixing step, during which said base and a second component are mixed together so as to obtain a mixture;

a treatment step, during which said mixture is subjected to an ohmic treatment so as to obtain the substantially pasteurized and/or sterilized food product; said second component comprises a first, substantially solid ingredient;

a first conveying step, during which said mixture is fed to a treatment station, where said mixture is subjected to an ohmic treatment; during the first conveying step, said first ingredient is conveyed to the treatment station at a temperature below about 10° C.; and during the treatment step, an ohmic treatment assembly subjects said mixture to a potential difference from about 500 Volt to about 5700 Volt with a frequency of up to about 26 KHz in an amount of time below 30 seconds so that said first ingredient, which, at the beginning of the treatment step, has a temperature below about 10° C., is pasteurized and/or sterilized.

* * * * *